US006923380B2

United States Patent
Nakabe et al.

(10) Patent No.: US 6,923,380 B2
(45) Date of Patent: Aug. 2, 2005

(54) CONTACTLESS IC CARD, RESPONDING METHOD, AND PROGRAM THEREFOR

(75) Inventors: Futoshi Nakabe, Hiroshima (JP); Tadakatsu Masaki, Hiroshima (JP); Shinji Kawano, Hiroshima (JP); Hideo Oozeki, Hiroshima (JP); Hiromi Ebara, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 29 days.

(21) Appl. No.: 10/810,662

(22) Filed: Mar. 29, 2004

(65) Prior Publication Data

US 2004/0182926 A1 Sep. 23, 2004

Related U.S. Application Data

(62) Division of application No. 10/299,903, filed on Nov. 20, 2002, now Pat. No. 6,749,117.

(30) Foreign Application Priority Data

Dec. 20, 2001 (JP) ........................................ 2001-354094

(51) Int. Cl.[7] .............................................. G06K 19/06
(52) U.S. Cl. ........................ 235/492; 235/488; 235/494
(58) Field of Search ................................ 235/488, 492, 235/494

(56) References Cited

U.S. PATENT DOCUMENTS

| 5,539,394 A | 7/1996 | Cato et al. |
| 5,591,951 A | 1/1997 | Doty |
| 5,686,902 A | 11/1997 | Reis et al. |
| 5,966,378 A | 10/1999 | Hämäläinen |
| 6,040,786 A | 3/2000 | Fujioka |
| 6,070,804 A * | 6/2000 | Miyamoto .................. 235/494 |
| 6,377,203 B1 | 4/2002 | Doany |
| 6,456,191 B1 | 9/2002 | Federman |
| 6,747,546 B1 * | 6/2004 | Hikita et al. ............. 340/10.31 |

FOREIGN PATENT DOCUMENTS

| EP | 0 841 578 A1 | 5/1998 |
| EP | 1 233 531 A1 | 8/2002 |
| JP | 09-006934 | 1/1997 |
| JP | 11-205334 | 7/1999 |
| WO | WO 01/33725 A1 | 5/2001 |

* cited by examiner

Primary Examiner—Thien M. Le
Assistant Examiner—Daniel A. Hess
(74) Attorney, Agent, or Firm—McDermott Will & Emery LLP

(57) ABSTRACT

The contactless IC card, the responding method, and the program that control the collision of response to the minimum, wherein the response judgment unit judges whether there is an initial response of the other contactless IC card at a specific time, and the response slot changing unit change the specific time based on the judgment result of the response judgment unit.

8 Claims, 18 Drawing Sheets

FIG.5

| | | CONTACTLESS IC CARD 501 | |
|---|---|---|---|
| | | Slot1 | Slot2 |
| CONTACT LESS IC CARD 502 | Slot1 | X(1) | O(2) |
| | Slot2 | O(3) | X(4) |

X = COLLISION   O = NO COLLISION

FIG.6

| | | | CONTACTLESS IC CARD 601 | | | |
|---|---|---|---|---|---|---|
| | | | Slot1 | | Slot2 | |
| | | | JUDGMENT | NO JUDGMENT | JUDGMENT | NO JUDGMENT |
| CONTACT LESS IC CARD 602 | Slot1 | JUDGMENT | X(1) | O(2) | O(3) | O(4) |
| | | NO JUDGMENT | O(5) | X(6) | O(7) | O(8) |
| | Slot2 | JUDGMENT | O(9) | O(10) | X(11) | X(12) |
| | | NO JUDGMENT | O(13) | O(14) | X(15) | X(16) |

X = COLLISION   O = NO COLLISION

FIG.7

| | | CONTACTLESS IC CARD 701 | | | |
| --- | --- | --- | --- | --- | --- |
| | | Slot1 | | Slot2 | |
| | | JUDGMENT | NO JUDGMENT | JUDGMENT | NO JUDGMENT |
| CONTACT LESS IC CARD 702 | Slot1 | ★ O(1) | x(2) | ★ O(3) | O(4) |
| | Slot2 | O(5) | O(6) | x(7) | x(8) | x = COLLISION   O = NO COLLISION

FIG.8

|  | | CONTACTLESS IC CARD 801 | | | |
|---|---|---|---|---|---|
|  | | Slot1 | Slot2 | Slot3 | Slot4 |
| CONTACT LESS IC CARD 802 | Slot1 | x(1) | O(2) | O(3) | O(4) |
| | Slot2 | O(5) | x(6) | O(7) | O(8) |
| | Slot3 | O(9) | O(10) | x(11) | O(12) |
| | Slot4 | O(13) | O(14) | O(15) | x(16) | x = COLLISION   O = NO COLLISION

FIG.9

| | | | CONTACTLESS IC CARD 901 | | | | | | | |
|---|---|---|---|---|---|---|---|---|---|---|
| | | | Slot1 | | Slot2 | | Slot3 | | Slot4 | |
| | | | JUDGMENT | NO JUDGMENT | JUDGMENT | NO JUDGMENT | JUDGMENT | NO JUDGMENT | JUDGMENT | NO JUDGMENT |
| CONTACTLESS IC CARD 902 | Slot1 | JUDGMENT | ×(1) | ○(2) | ○(3) | ○(4) | ○(5) | ○(6) | ○(7) | ○(8) |
| | | NO JUDGMENT | ○(9) | ×(10) | ○(11) | ○(12) | ○(13) | ○(14) | ○(15) | ○(16) |
| | Slot2 | JUDGMENT | ○(17) | ○(18) | ×(19) | ○(20) | ○(21) | ○(22) | ○(23) | ○(24) |
| | | NO JUDGMENT | ○(25) | ○(26) | ○(27) | ×(28) | ○(29) | ○(30) | ○(31) | ○(32) |
| | Slot3 | JUDGMENT | ○(33) | ○(34) | ○(35) | ○(36) | ×(37) | ○(38) | ○(39) | ○(40) |
| | | NO JUDGMENT | ○(41) | ○(42) | ○(43) | ○(44) | ○(45) | ×(46) | ○(47) | ○(48) |
| | Slot4 | JUDGMENT | ○(49) | ○(50) | ○(51) | ○(52) | ○(53) | ○(54) | ×(55) | ×(56) |
| | | NO JUDGMENT | ○(57) | ○(58) | ○(59) | ○(60) | ○(61) | ○(62) | ×(63) | ×(64) |

×=COLLISION  ○=NO COLLISION

FIG.10

| | | CONTACTLESS IC CARD 1001 | | | | | | | |
|---|---|---|---|---|---|---|---|---|---|
| | | Slot1 | | Slot2 | | Slot3 | | Slot4 | |
| | | JUDGMENT | NO JUDGMENT | JUDGMENT | NO JUDGMENT | JUDGMENT | NO JUDGMENT | JUDGMENT | NO JUDGMENT |
| CONTACTLESS IC CARD 1002 | Slot 1 | ★ | ○(1) | ○(3) | ○(4) | ○(5) | ○(6) | ○(7) | ○(8) |
| | Slot 2 | ○(9) | x(2) | ○(11) | x(12) | ○(13) | ○(14) | ○(15) | ○(16) |
| | Slot 3 | ○(17) | ○(18) | ○(19) | ○(20) | ○(21) | x(22) | ○(23) | ○(24) |
| | Slot 4 | ○(25) | ○(26) | ○(27) | ○(28) | ○(29) | ○(30) | x(31) | x(32) | x = COLLISION   ○ = NO COLLISION

US 6,923,380 B2

CONTACTLESS IC CARD, RESPONDING METHOD, AND PROGRAM THEREFOR

This is a divisional application of U.S. Ser. No. 10/299,903 filed Nov. 20, 2002, now U.S. Pat. No. 6,749,117.

BACKGROUND OF THE INVENTION

1. Field of the Invention

This invention relates to a contactless IC card, a responding method, and a program therefor, and more specifically relates to the contactless IC card, the responding method, and the program that respond to a request sent from a reader/writer by means of a time slot.

2. Prior Art of the invention

Generally, it is the time slot system that is applied to the communication between a contactless IC card and a reader/writer; the contactless IC card for sending and receiving data by means of the electromagnetic induction method; and the reader/writer for recognizing the contactless IC card. The reason for adopting the time slot is that a plurality of contactless IC cards exist simultaneously within a communication area of a reader/writer, and then the plurality of contactless IC cards respond to the polling of the reader/writer simultaneously, in which case any contactless IC card cannot communicate with the reader/writer normally because each response signal used for the response is in collision with one another.

The communication method of the time slot system will be described hereafter.

(1) In order to recognize existence of contactless IC card, the reader/writer sends an initial response request command to the contactless IC card as a request. The initial response request command contains "the number of slots" that is required to control the time (time slot) to make an initial response to the request executed by the contactless IC card, or a value that is required to calculate "the number of slots".

(2) The contactless IC card sends back the initial response to the request at a time slot (one of 1 to "the number of slots") of a specific time set after receiving the request in response to the initial response request command. The time slot used for response, which is a period between specific times, is decided by the card itself on the basis of a random numbers.

(3) If it is detected the collision of initial responses that appear when a plurality of contactless IC cards select a same time slot, the reader/writer resends an initial response request.

(4) The reader/writer recognizes all the contactless IC cards by receiving the initial responses from all the contactless IC cards without collision, and then the sequence for identifying the contactless IC cards is completed.

The following explains in more detail about the above-mentioned processing according to FIG. 16 to FIG. 18. Besides, the following processing is concerned with the contactless IC card adjusted to the international standard ISO/IEC14443 for the proximity contactless IC card.

For instance, ISO/IEC14443 can be applied to a contactless Telephone Card. More specifically, it is a case where that contactless IC cards 1601 and 1602 having a function of telephone card are simultaneously put into a reader/writer functioning as a payphone, which is shown as FIG. 16.

The recognition system of the contactless IC card of ISO/IEC14443 executes the recognition of the contactless IC card according to the following procedure.

First, the reader/writer 1600 as the payphone sends an initial response request (request). The initial response request has a format shown in FIG. 18 and notifies the contactless IC card of the number of time slots (N) by means of three bits 1803 composed of bit 1 to bit 3, those bits included in 8 bits of PARAM 1802 composing the initial response request 1801. Besides, APf 1804 is a header indicating the initial response request command, while AFI 1805 indicates an adaptive class of the contactless IC card. And CRC (Cyclic Redundancy Check) 1806 is CRC from APf to PARAM.

Besides the contactless IC card responds to the initial response request at one of N slots of 1 to N, however, the following explanation is made on the basis that the number of time slots (N) is assumed to 4. That is to say, the contactless IC cards 1601 and 1602 select a time slot from 1 to 4 slots, and make the initial response.

In a first card identification processing 1701 shown in FIG. 17, an initial response request R1[REQB] (1702) is sent from the reader/writer 1600. When the contactless IC cards 1601 and 1602 generate "1" respectively as a random number in response to the initial response request R1 (1702), the respective responses are made as the initial responses [ATQB] A21 and A31 within the time slot 1 (1704). In this case, since both the contactless IC cards 1601 and 1602 send the initial responses simultaneously at the same time, the reader/writer 1600 detects the collision of the initial responses of the contactless IC cards. Accordingly, the reader/writer 1600 starts the identification processing again.

In a second identification processing 1707, an initial response request R2 (1703) is sent from the reader/writer 1600. When the contactless IC cards 1601 and 1602 generates "3" and "2" respectively in response to the initial response request, the responses are made by packets A22 sent within the time slot 3 (1705) and packets A32 sent within the time slot 2 (1706) respectively. In this case, since the reader/writer 1600 does not detect the collision, the reader/writer can identify all the contactless IC cards, and then the identification processing is completed. The above processing is the identification of contactless IC card adaptive to the ISO/IEC 14443 standard. Under the ISO/IEC 14443 standard, the period between when the contactless IC card receives the initial response request command and when it responds to the request at the time slot 1 is defined as 302 μsec, and the period of a time slot is as 2266 μsec. The period (μsec), from when the contactless IC card receives the initial request from the reader/writer 1600 to when the card sends the initial response, can be found according to the following equation (Equation 1).

$$\text{Period } (\mu\text{sec}) = 302\ \mu\text{sec} + 2266\ \mu\text{sec} \times (\text{the selected number of slots} - 1) \quad \text{EQUATION 1}$$

As one of such systems, the wireless identification device (Japanese laid-open publication No. 9-6934) is disclosed, and there is the slot maker system as the other similar system to the time slot system.

The slot marker system is a method in which, the reader/writer sends an initial-response request using the time-slot method, and then sends a slot marker command at the timing of the start of each slot, which indicates the start of the slot. Each IC card responds by using the time slot specified by the reader/writer, so the aspect of identifying IC cards is essentially the same as in the time-slot method.

Under the wireless identification device (Japanese laid-open publication No. 9-6934) or the contactless IC card compliant with International Standard ISO/IEC14443, when the contactless IC card responds to the reader/writer, the contactless IC card itself selects the time slot by means of random numbers, and the contactless IC card response during a specific time interval specifying the time slot. Therefore, for instance, where random numbers generated by a plurality of contactless IC cards are the same one, the selected time slots are the same and the initial response requests never fail to come into collision. In this case, it is necessary for the reader/writer to send the initial response request command again and recognize the contactless IC card. It causes to delay the recognition of the contactless IC card.

By increasing the number of time slots that the reader/writer allocates for the contactless IC card, it is possible to decrease the probability that the plurality of contactless IC cards select the same time slot. However, as the time slot increases in number, the time for completing (terminating) the response to the initial response request at all the time slots comes to be longer. In results, it takes a lot of time for the reader/writer to complete the recognition of the contactless IC card.

The above-mentioned problem, that it takes a lot of time to complete the recognition, appears remarkably in the system such as a ticket examining machine at a wicket, wherein the user has to let the reader/writer recognize the contactless IC card without stopping. That is to say, if the recognition of contactless IC card is delayed, the use has to stop and it becomes an obstacle in the utilization of the system.

Additionally, if it is possible to recognize the contactless IC card speedier than ever, the system will be able to be applied to a speedier mobile device. For this purpose, it has been expected to improve the speed-up of the recognition and the processing.

SUMMARY OF THE INVENTION

The present invention has an object to provide a contactless IC card, responding method, and the program, those in which the collision of the initial response is brought under control.

In order to achieve the above object, the invention adopts the following unit. Specifically, it is assumed in the invention that a contactless IC card respond to a request sent from a reader/writer at a specific time. The contactless IC card comprises response judgment unit operable to judge if there is a response of the other contactless IC card at the specific time; and response slot changing unit operable to change the specific time based on the judgment result of the response judgment unit.

Accordingly, the initial response of the other contactless IC card or the collision of initial response is judged, and the time slot to be used for response is changed if there is an initial response or the collision of initial response, and hereupon it is possible to control the collision of initial response at the minimum.

Besides, the specific time can be selected from 1 or a plurality of time slots given by the reader/writer, for example.

The contactless IC card further comprises use deciding unit operable to decide if the response judgment unit is used or not.

Under such arrangement, the execution of judging if there is an initial response of the other contactless IC card is decided with a specific probability, and in result the collision of response can be reduced even when the contactless IC cards of the invention response.

In addition, the contactless IC card further comprises last slot judgment unit operable to judge if the time slot selected from the plurality of time slots given by the reader/writer is the last one or not, wherein the response slot changing unit changes the time slot to be used for response based on the judgment result of the last slot judgment unit.

Under such configuration, the time slot cannot fail to be changed if possible, and this increases chances for avoiding the collision. Therefore, it is possible to reduce the collision.

On the other hand, the contactless IC card responding to the request sent from the reader/writer at a specific time may be arranged so as to comprise measuring unit operable to measure electromotive force derived from the reader/writer and response slot deciding unit operable to decide the specific time based on the electromotive force measured by the measuring unit.

More specifically, where the distance between the contactless IC card and the reader/writer is fixed, the response slot deciding unit decides the specific time based on the information indicating the relation between the electromotive force and the magnetic field intensity and the measured value of the electromotive force measured by the measuring unit.

Under this arrangement, where the magnetic field intensity is fixed, the conditions of the contactless IC card is estimated based on the measured value of the electromotive force and the information indicating the relation between the electromotive force and the magnetic field intensity, and thus the response time is decided based on the estimation result. Thereby it is possible to reduce the collision of initial response of the contactless IC card.

Moreover, magnetic field intensity obtaining unit obtains form the request the information regarding the magnetic field intensity of the electromagnetic waves outputted from the reader/writer.

Under the arrangement, even if the magnetic field intensity is not fixed, the magnetic field intensity obtaining unit obtains the information regarding the magnetic field intensity included in the initial request, hereupon the conditions of the contactless IC card can be estimated based on the measured value of the electromotive force and the information indicating the relation between the electromotive force and the magnetic field intensity. Therefore, it is possible to reduce the collision of initial response of the contactless IC card.

Furthermore, the response slot deciding unit decides the specific time based on the differential value at the transition of the electromotive force, the measured value of the electromotive force, and the information indicating the relation between the electromotive force and the magnetic field intensity.

Under such configuration, the conditions of the contactless IC card is estimated based on the differential value at the transition of the electromotive force, the measured value of the electromotive force, and the information indicating the relation between the electromotive force and the magnetic field intensity, hereupon the response time (time slot) is decided based on the estimation result. For this reason, the electromotive force is not necessary to be fixed and it is not also necessary to obtain the information regarding the magnetic field intensity.

Besides, the contactless IC card can be carried out by means of a computer. In this case, the response judgment unit, the response slot changing unit, the use deciding unit, the last slot judgment unit, the measuring unit, the response slot deciding unit, and the magnetic field intensity obtaining unit can be carried out by executing a program on the computer.

BRIEF DESCRIPTION OF THE DRAWINGS

FIG. 5 is a diagram showing a first example of a probability of collision when conventional contactless IC cards make an initial response mutually.

FIG. 6 is a diagram showing a first example of a probability of collision when contactless IC cards of the present invention make an initial response mutually.

FIG. 7 is a diagram showing a probability of collision when a conventional contactless IC card and a contactless IC card of the present invention make an initial response each other.

FIG. 8 is a diagram showing a second example of a probability of collision when conventional contactless IC cards make an initial response mutually.

FIG. 9 is a diagram showing a second example of a probability of collision when contactless IC cards of the present invention make an initial response mutually.

FIG. 10 is a diagram showing a second example of a probability of collision when a conventional contactless IC card and a contactless IC card of the present invention make an initial response each other.

DESCRIPTION OF THE PREFERRED EMBODIMENTS

In order to understand the invention, here is described about the preferred embodiments of the present invention according to the attached drawings. Besides, the following embodiments are concrete examples of the invention and do not limit the technical field of the invention.

Embodiment 1

Figure 1:
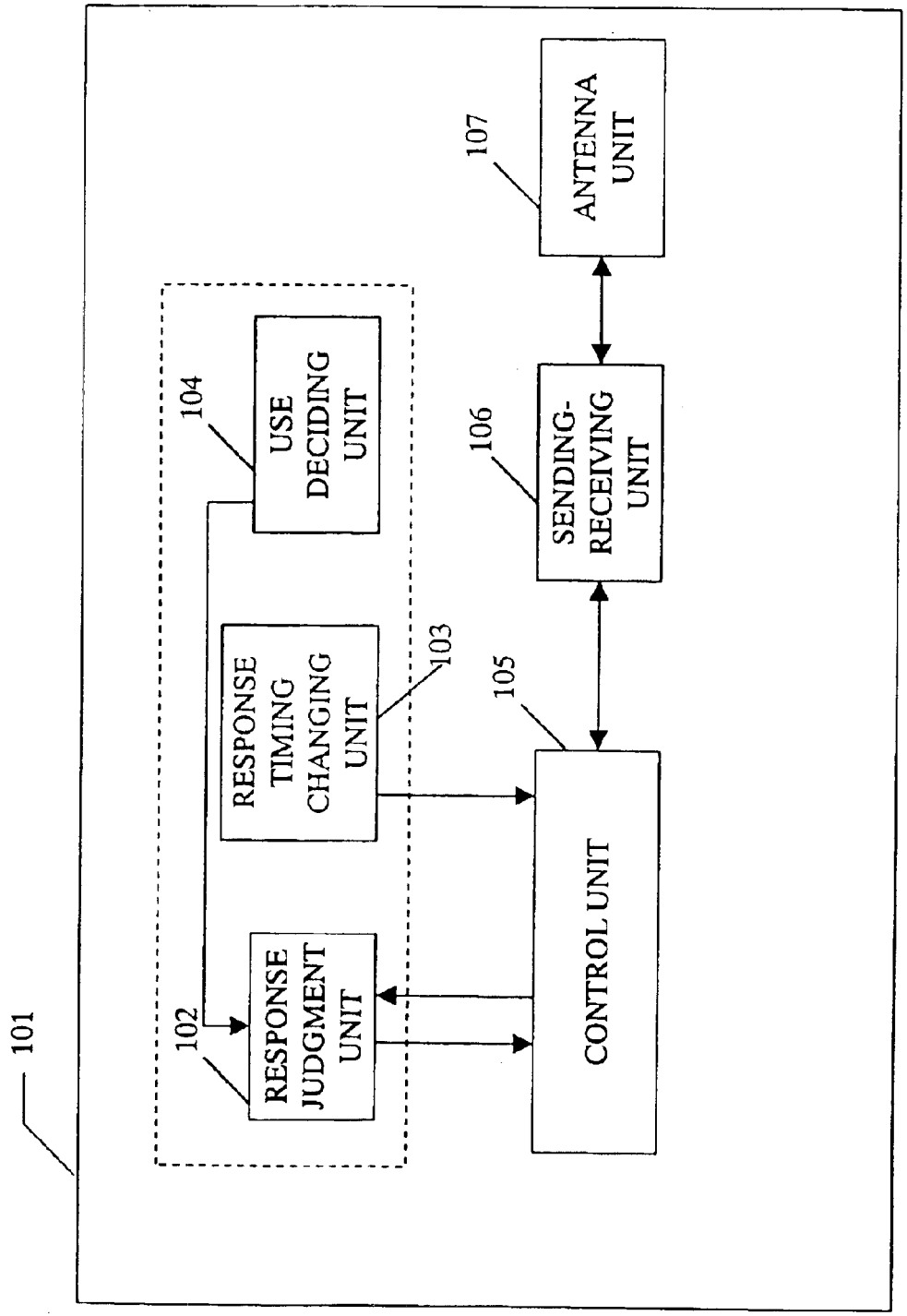
FIG. 1 is a functional block diagram of a contactless IC card in Embodiment 1.
Figure 2:
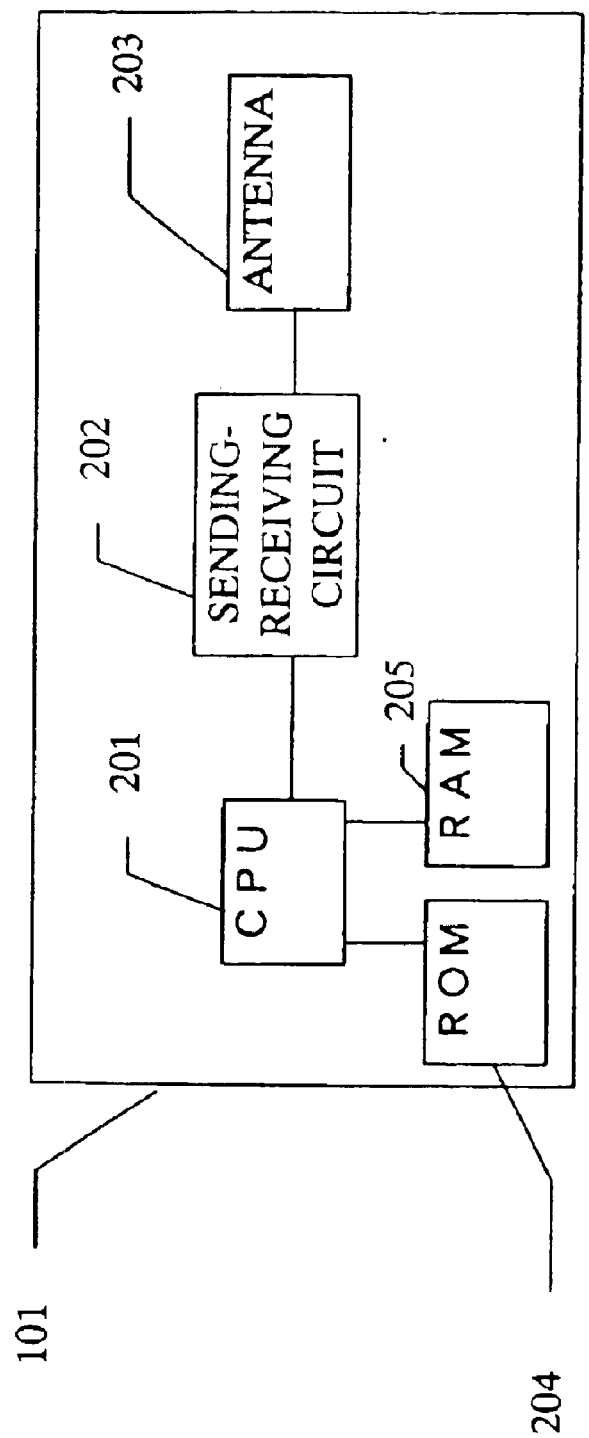
FIG. 2 is a hardware configuration diagram of the contactless IC card in Embodiment 1.

First, the following explanation is related to a contactless IC card in Embodiment 1 of the invention. FIG. 1 is a functional block diagram of the contactless IC card in Embodiment 1. FIG. 2 is a hardware configuration diagram of the contactless IC card. The contactless IC card 101 comprises an antenna 203, a sending-receiving circuit 202, CPU 201, ROM (Read Only Memory) 204 storing a program controlling the contactless IC card, and RAM (Random Access Memory) 205 utilized as a working area, for example, at executing the program.

And when the contactless IC card 101 approaches into the communication area of the reader/writer, the contactless IC card 101 is to work by the power induced by electromagnetic waves from the reader/writer through the antenna 203.

In case of showing the contactless IC card per function, the contactless IC card comprises antenna unit 107, sending-receiving unit 106, control unit 105, response judgment unit 102, response slot changing unit 103, and use deciding unit 104. Besides, the detailed processing of each unit will be explained as the occasion may demand.

Moreover, for instance, the response judgment unit 102, the response slot changing unit 103, and the use deciding unit 104 are stored in ROM 204 shown in FIG. 2 as a program, and if necessary, each program is read out and executed by CPU 201.

Figure 3:
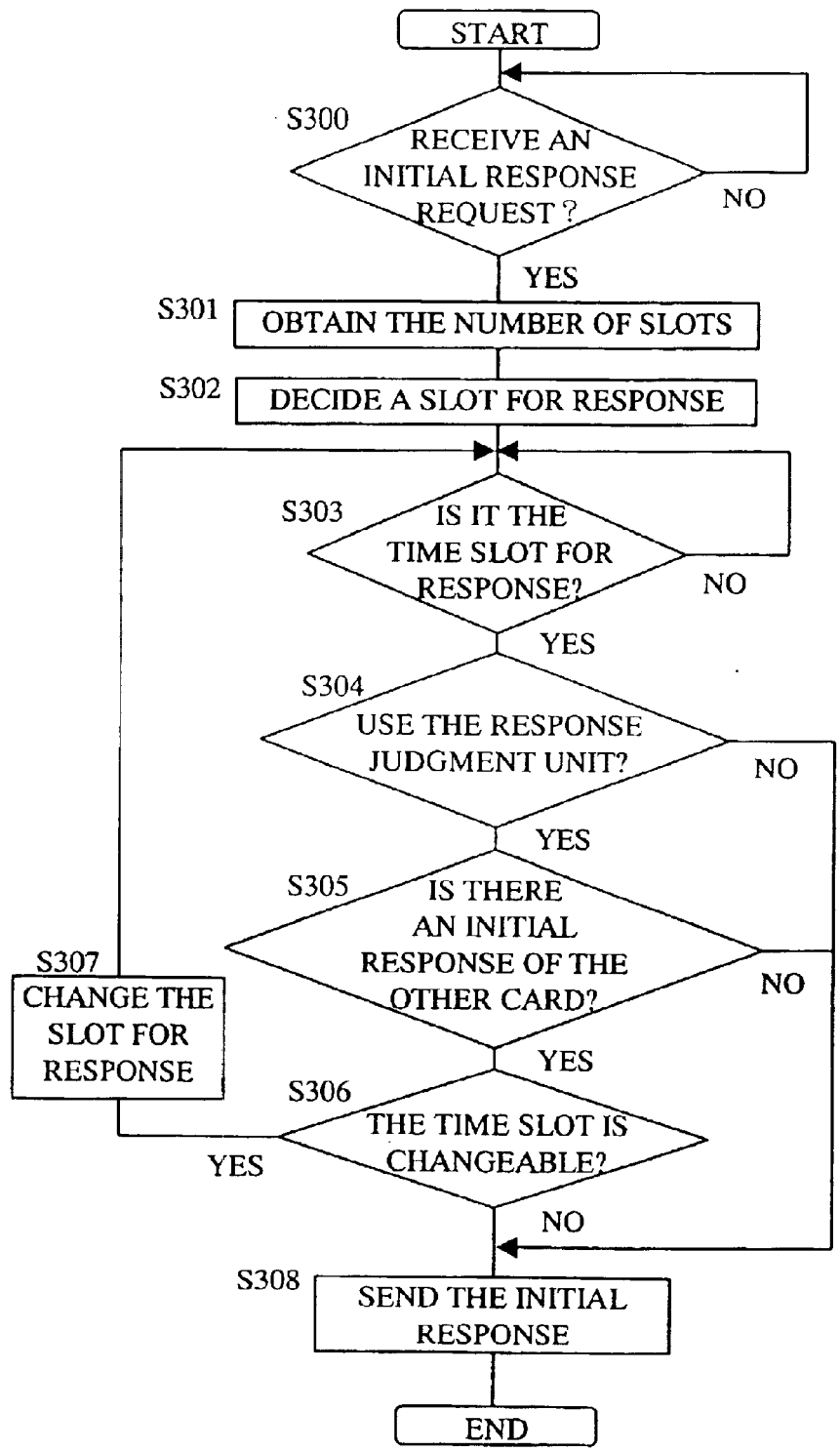
FIG. 3 is a flowchart of the processing executed by the contactless IC in Embodiment 1.
Figure 16:
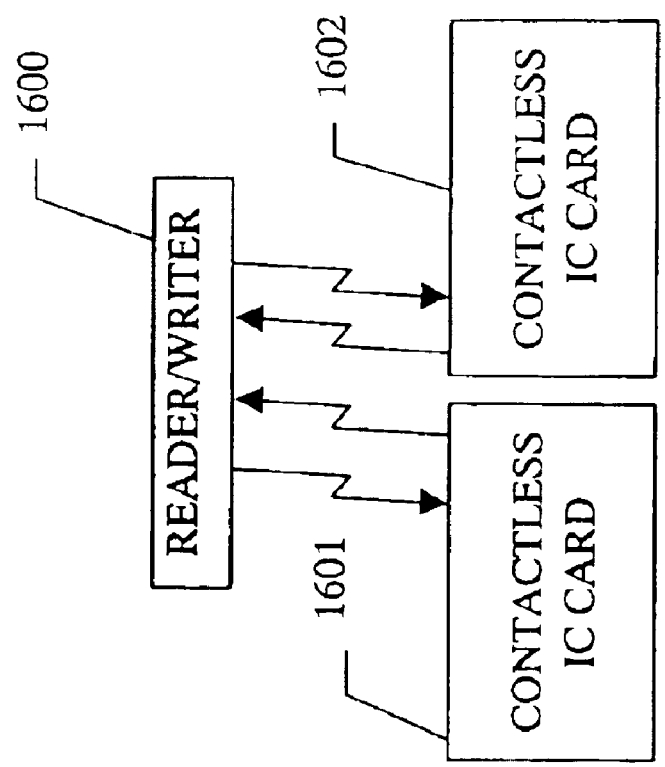
FIG. 16 is an image diagram showing the communication condition between the reader/writer and the contactless IC card.
Figure 17:
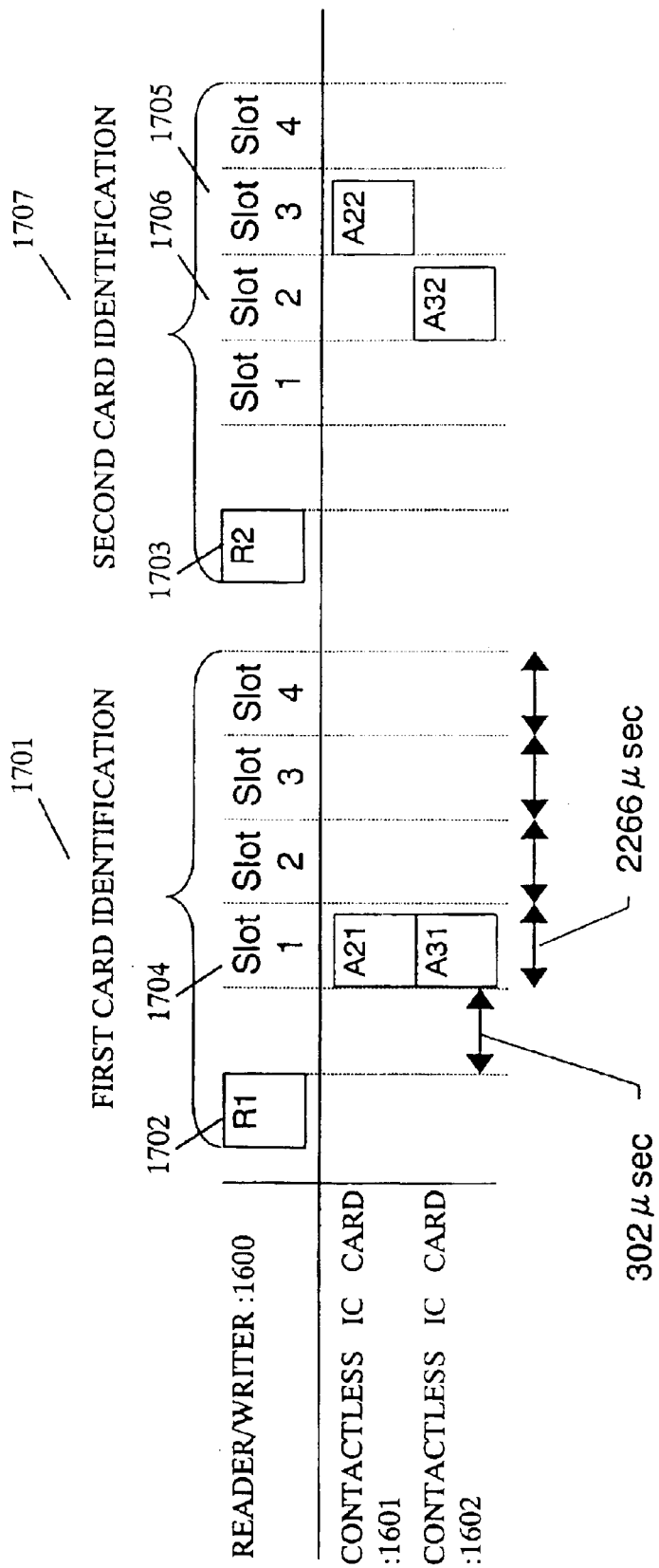
FIG. 17 is an image diagram showing the time slot method.

According to FIG. 3 and FIG. 4, the processing of the contactless IC card in Embodiment 1 is explained hereinafter. FIG. 3 is a flowchart of the processing executed by the contactless IC card 101. Besides, in order to understand this, it is arranged in Embodiment 1 that two contactless IC cards 1601 (the contactless IC card 101) and 1602 be in communication with the reader/writer 1600 shown in FIG. 16.

Figure 18:
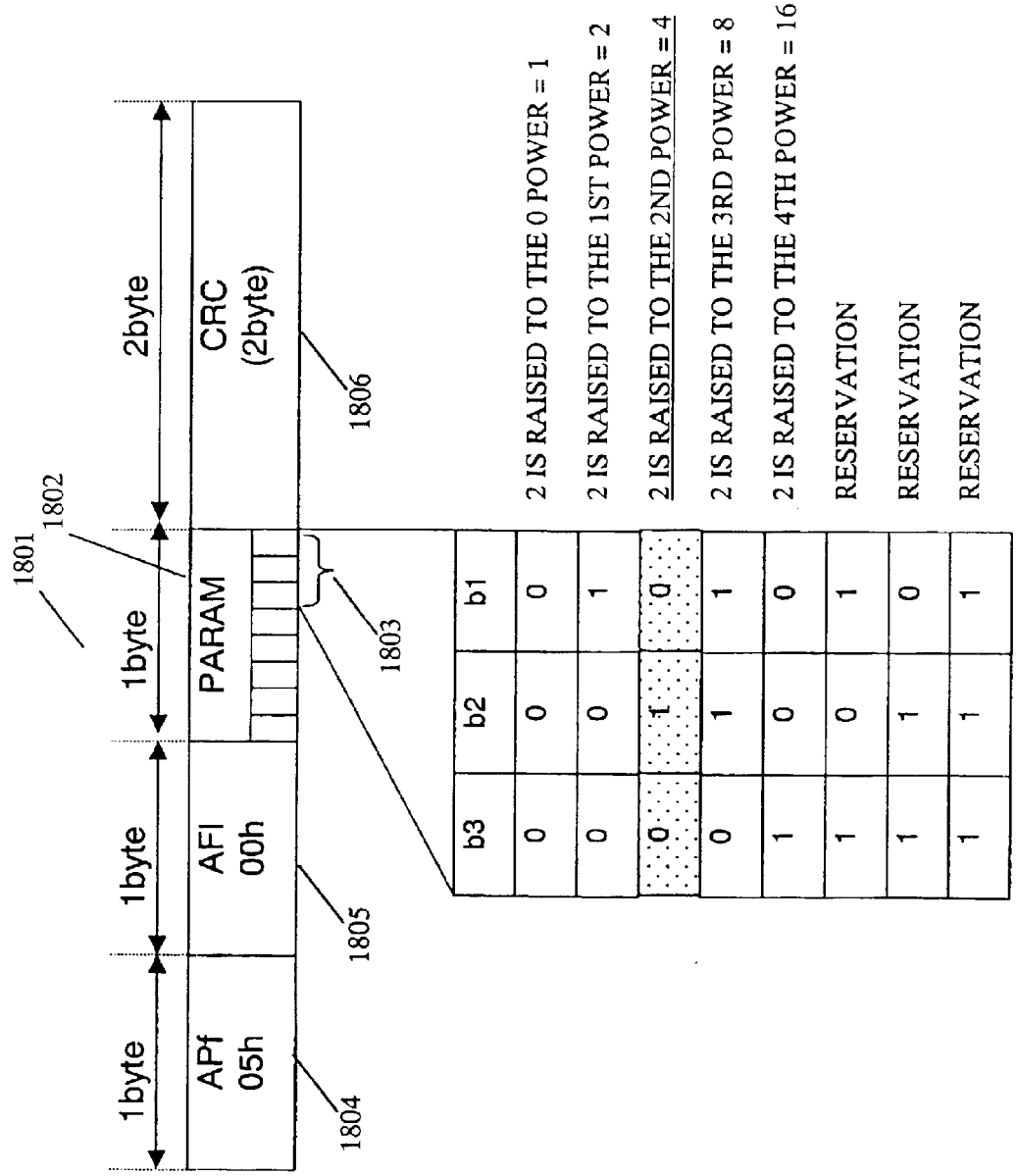
FIG. 18 is a diagram showing a format of the initial response request packet.

First, the control unit 105 composing the contactless IC card 101 waits for receiving an initial response request that the reader/writer sends (FIG. 3: S300, NO). At receiving the initial response request from the reader/writer through the antenna unit 107 and the sending receiving unit 106, the control unit 105 obtains the number of time slots from the initial response request (FIG. 3: S300, YES to S301). The number of time slots can be specified based on a value represented by 3 bits (1803) shown as Bit 1 to Bit 3 of PARAM in FIG. 18. And where a value represented by these bits is defined as n, 2 raised to the n th power becomes the number of time slots. The equation for calculating the number of time slots is as follows:

$$\text{Number of Time Slots } (N) = 2^n \qquad \text{EQUATION 2}$$

(n is a value from 0 to 4 represented by Bit 1 to Bit 3)

Figure 4:
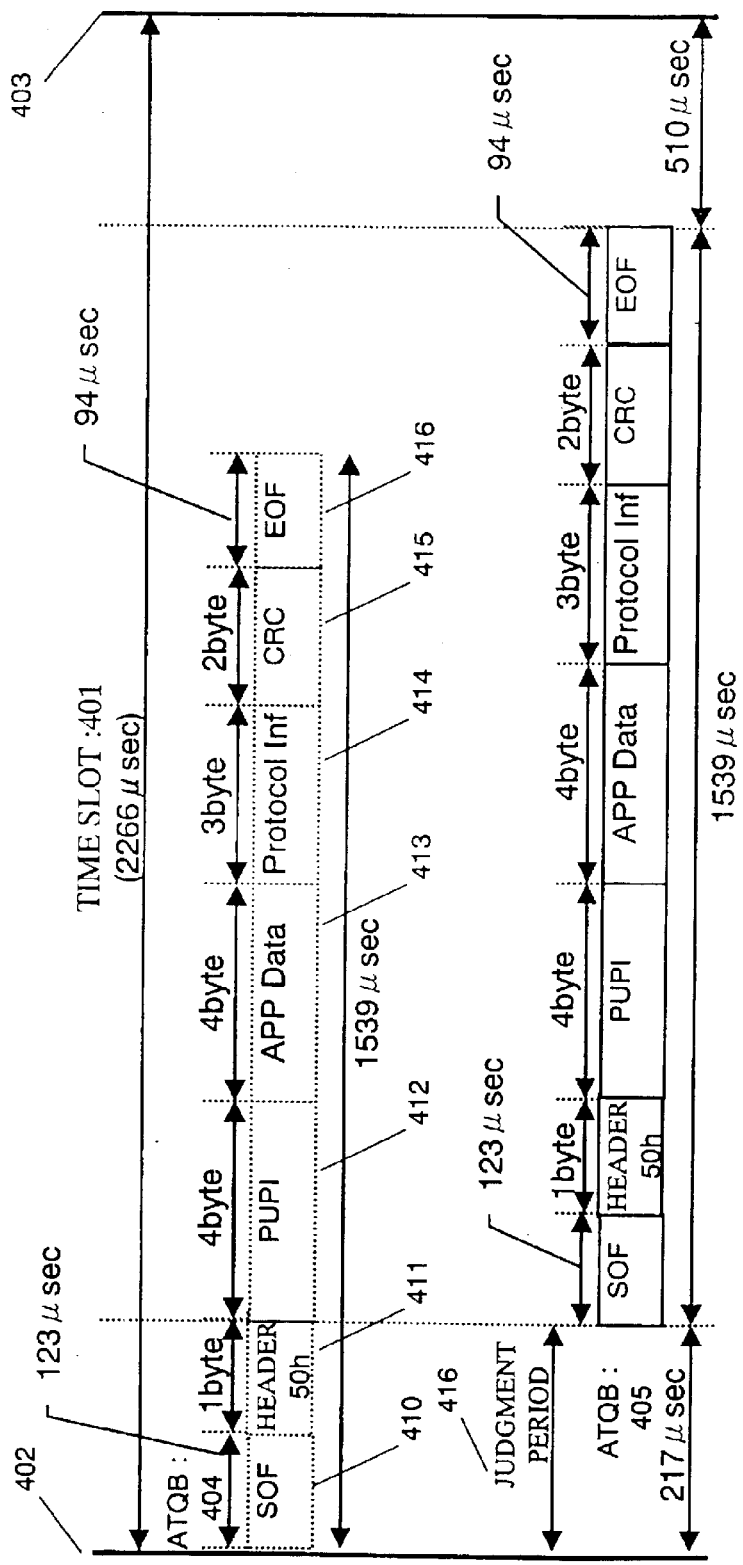
FIG. 4 is a diagram showing a format of a time slot and an initial response.

It is general as shown in FIG. 4 that the time slot 401 is configured by intervals of the time between specific time 402 and time 403 at a lapse of 2266 μsec.

Next, the control unit 105 decides a time slot for response by selecting one from whole numbers between 1 and the number of time slots (N) found by the equation 2 (FIG. 3: S302).

Subsequently, the control unit 105 waits until the starting time of the time slot at which the initial response is sent to the reader/writer (FIG. 3: S303, No). When the time reaches the starting time mentioned above, the use deciding unit 104 decides, according to a specified probability for example, whether or not to use the response judgment unit 102 (FIG. 3: S303, Yes to S304). However, in the case when the response judgment unit 102 is always used, there is no need for the use-deciding unit 104.

In case of using the response judgment unit 102, the response judgment unit 102 judges whether there is an initial response from the other contactless IC card, like a following procedure (FIG. 3: S304, Yes to S305).

The contactless IC card, which is not provided with the response judgment unit 102 or does not use it, sends ATQB 404 that is the initial response just after the specific time 402. Besides, the above-mentioned ATQB 404 comprises SOF (Start of Frame) 410, header (initial response header) 411, PUPI (Card unique ID: Pseudo-unique PICC Identifier) 412, APP Data (Application Unique Data) 413, Protocol Inf (Protocol information) 414, CRC (Cyclic Redundancy Check) 415, and EOF (End of Frame) 416.

The contactless IC card 101 may send the initial response (of which transmittal time is approximately 1539 µsec) within the period of the time slot 401 (within 2266 µsec from the specific time 402), thus in this case, ATQB is sent after a specific judgment period 416 elapses from the specific time 402. Besides, the judgment period 416 is 217 µsec, for example.

However, before the ATQB 405 is sent, when the SOF 410 and the header 411 of the other contactless IC card (for example, contactless IC card 1602), or the collision of the initial response are received, the response judgment unit 102 decides that there is an initial response of the other contactless IC card (FIG. 3: S305, YES to S306).

The response judgment unit 102 decides that there is the initial response of the other contactless IC card, and then the response slot changing unit 103 judges whether the time slot is changeable or not (FIG. 3: S306). Besides, the response judgment unit 102 can receive the initial response, the SOF 410 and the header 411, those sent from the other contactless IC card, in the same way as the steps of receiving the initial response request from the reader/writer.

Changing of the time slot is defined in this case as follows, for example; in case of obtaining a plurality of time slots form the above reader/writer and where the specific time 402 does not correspond to a final time slot, the initial response is made by another time slot following the time slot. Besides, "another time slot following the time slot" may be a next time slot or a plurality of time slots. The "case where it is not changeable" means, for example, that the number of the time slot sent from the reader/writer is 1, or that the time slot being used for the present initial response is last slot, that mean the final time slot given by the reader/writer.

When the response slot changing unit 103 decides that the time slot is changeable, the time slot for response is changed and the control unit 105 judges again whether it is the time slot for response (FIG. 3: S306, YES to S307 to S303).

In case where the response judgment unit 102 is not used (FIG. 3: S304, NO), in case where there is no initial response of the other contactless IC card (FIG. 3: S305, NO), or in case where the it is impossible to change the slot (FIG. 3: S306, NO), the control unit 105 sends the initial response to the reader/writer (FIG. 3: S308).

As mentioned above, it is judged the initial response of the other contactless IC card and the collision of the initial response, and the time slot to be used for response is changed in case where there is the other initial response or where the collision of initial response is detected, and consequently it is possible to provide the contactless IC card controlling the collision of initial response at the minimum.

Next, how the above-mentioned processing reduces the collision is explained specifically hereinafter according to the attached drawings, FIG. 5 represents the probability of collision when the conventional contactless IC cards 501 and 502 make initial responses to the reader/writer. Besides, "x" represents that there is a collision, while "O" represents that there is no collision.

Here is assumed, for example, that the number of time slots given by the reader/writer be 2. That is to say, the contactless IC cards 501 and 502 can select one from Slot 1 and Slot 2 respectively.

First, where the respective contactless IC cards 501 and 502 selects either one of Slot 1 or Slot 2, there are 2×2=4 conditions. FIG. 5 shows respective conditions in a table, and each of conditions is numbered from (1) to (4), and is explained as follows.

(1) The contactless IC card 501 selects Slot 1, and the contactless IC card 502 selects Slot 1. Consequently, the collision occurs.
(2) The contactless IC card 501 selects Slot 2, and the contactless IC card 502 selects Slot 1. Consequently, the collision does not appear.
(3) The contactless IC card 501 selects Slot 1, and the contactless IC card 502 selects Slot 2. Consequently, the collision does not appear.
(4) The contactless IC card 501 selects Slot 2, and the contactless IC card 502 selects Slot 2. Consequently, the collision occurs.

According to (1) to (4), the probability of collision is calculated as follows:

$$2/4 = 50\%$$ EQUATION 3

FIG. 6 also represents the probability of collision in case of using the contactless IC cards 601 and 602 of the present invention, and it is also assumed that the number of time slots given by the reader/writer be 2. That is to say, the respective contactless IC cards 601 and 602 can select one from Slot 1 and Slot 2.

The probability whether the use deciding unit 104 judges the initial response of the other contactless IC card or not is assumed to be ½, that is, cases where the initial response is judged and where the initial response is not judged are in even shares.

In this case, regarding the contactless IC cards 601 and 602 there is two cases every time slot where the collision is judged and where not judged, accordingly there are 4×4=16 conditions.

Each condition is shown in a table of FIG. 6. Each of conditions is numbered from (1) to (16), and is explained as follows.

(1) The contactless IC card 601 selects Slot 1 and judges if there is an initial response of the other contactless IC card, while the contactless IC card 602 selects Slot 1 like the contactless IC card 601 and judges if there is an initial response of the other contactless IC card. The respective cards have not made initial responses so that the contactless IC cards 601 and 602 send the initial responses to Slot 1, and in result, the collision occurs.
(2) The contactless IC card 601 selects Slot 1 and then sends Slot 1 the initial response without judging if there is an initial response of the other contactless IC card, while the contactless IC card 602 selects Slot 1 and judges if there is an initial response of the other contactless IC card. The contactless IC card 602 recognizes that the contactless IC card 601 sent the initial response to Slot 1, and then sends the initial response to Slot 2 to avoid the collision. Therefore, the collision does not appear.
(3) The contactless IC card 601 selects Slot 2 and judges if there is an initial response of the other contactless IC card, while the contactless IC card 602 selects Slot 1 and judges if there is an initial response of the other contactless IC card. The contactless IC cards 601 and 602 monitor each time slot and decide there is no initial response of the other contactless IC card in said slot, so that each card sends the initial response to the selected slot respectively. Therefore, the collision does not appear.
(4) The contactless IC card 601 selects Slot 2 and sends the initial response to Slot 2 without judging if there is an initial response of the other contactless IC card. The contactless IC card 602 selects Slot 1 and judges if there is an initial response of the other contactless IC card. The contactless IC card 602 monitors Slot 1 and decides there is no initial response of the other contactless IC card, so that the card 602 sends the initial response to Slot 1. The contactless IC card 601 sends the initial response to Slot 2. Therefore, the collision does not appear.

(5) The contactless IC card 601 selects Slot 1 and judges if there is an initial response of the other contactless IC card. The contactless IC card 602 selects Slot 1 and sends the initial response to Slot 1 without judging if there is an initial response of the other contactless IC card. In this case, the contactless IC card 601 recognizes the contactless IC card 602 sent the initial response to Slot 1, and then sends the initial response to Slot 2. Therefore, the collision does not appear.

(6) The contactless IC card 601 selects Slot 1 and does not judge if there is an initial response of the other contactless IC card. Like the contactless IC card 601, the contactless IC card 602 selects Slot 1 and does not judge if there is an initial response of the other contactless IC card. Both the contactless IC cards 601 and 602 send the initial responses to Slot 1, and in result, the collision occurs.

(7) Like (3) and (4), the different time slot is selected so that the collision does not appear.

(8) Like (3) and (4), the different time slot is selected so that the collision does not appear.

(9) Like (3) and (4), the different time slot is selected so that the collision does not appear.

(10) Like (3) and (4), the different time slot is selected so that the collision does not appear.

(11) The contactless IC card 601 selects Slot 2 and judges if there is an initial response of the other contactless IC card, but the card 601 cannot change the slot, accordingly sends the initial response to Slot 2. Likewise, the contactless IC card 602 selects Slot 2 and judges if there is an initial response of the other contactless IC card, but the card 602 cannot change the slot, accordingly sends the initial response to Slot 2. Therefore, the collision occurs.

(12) Like (11), the respective cards can only send the initial responses to Slot 2, and in result the collision occurs.

(13) Like (3) and (4), the different time slot is selected so that the collision does not appear.

(14) Like (3) and (4), the different time slot is selected so that the collision does not appear.

(15) Like (11), the respective cards can only send the initial responses to Slot 2, and in result the collision occurs.

(16) Like (11), the respective cards can only send the initial responses to Slot 2, and in result the collision occurs.

According to the above conditions, the probability of collision occurrence is calculated as follows:

$$6/16 \approx 37.5\% \qquad \text{EQUATION 4}$$

As described above, the probability of collision occurrence found by the equation 4 is smaller than that by the equation 3. Therefore, the probability of the collision can be reduced under the conditions of using the contactless IC cards of the invention.

Next, FIG. 7 shows a case of using the contactless IC card 701 of the invention and the conventional contactless IC card 702, and the number of time slots is defined as 2. Accordingly, the contactless IC cards 701 and 702 can select either one of Slot 1 or Slot 2.

The probability whether the use deciding unit 104 judges the initial response of the other contactless IC card or not is assumed to be ½, that is, cases where the initial response is judged and where the initial response is not judged are in even shares.

In this case, regarding the contactless IC cards 701 and 702 there is two cases every time slot where the collision is judged and where not judged, accordingly there are 4×2=8 conditions.

Each condition is shown in a table of FIG. 6. And each of conditions is numbered from (1) to (8), and is explained as follows.

(1) The contactless IC card 701 selects Slot 1 and judges if there is an initial response of the other contactless IC card, while the contactless IC card 702 sends the initial response to Slot 1. The contactless IC card 701 recognizes the initial response of the contactless IC card 702 and then sends the initial response to Slot 2. Therefore, the collision is avoided and does not appear.

(2) The contactless IC card 701 selects Slot 1 and does not judge if there is an initial response of the other contactless IC card, and then sends the initial response to Slot 1. The contactless IC card 702 sends the initial response to Slot 1. Both contactless IC cards send the initial responses to Slot 1, therefore the collision occurs.

(3) The contactless IC card 701 select Slot 2 and judges if there is an initial response of the other contactless IC card, and then sends initial response to Slot 2 because it cannot send the initial response to Slot 1. The contactless IC card 702 sends the initial response to Slot 1. Therefore, the collision does not appear.

(4) Each contactless IC card sends the initial response to a different time slot respectively like (3), and the collision does not appear.

(5) Each contactless IC card sends the initial response to a different time slot respectively like (3), and the collision does not appear.

(6) Each contactless IC card sends the initial response to a different time slot respectively like (3), and the collision does not appear.

(7) The contactless IC card 701 selects Slot 2 and judges if there is an initial response of the other contactless IC card, and then sends the initial response to Slot 2 because it cannot send the initial response to Slot 1. The contactless IC card 702 sends the initial response to Slot 2. In result, the collision occurs.

(8) The contactless IC card 701 selects Slot 2 and does not judges if there is an initial response of the other contactless IC card, and then sends the initial response to Slot 2. The contactless IC card 702 sends the initial response to Slot 2. In result, the collision occurs.

According to the above conditions, the probability of collision occurrence can be calculated as follows.

$$3/8 \approx 37.5\% \qquad \text{EQUATION 5}$$

As described above, the probability of collision occurrence found by the equation 5 is smaller than that by the equation 3. Therefore, the probability of the collision can be reduced under the conditions of using both the conventional contactless IC card and the contactless IC card of the invention.

Here is a consideration in a case that the contactless IC card 701 of the present invention is not provided with the use deciding unit 104, that is, the card judges if there is an initial response of the other contactless IC card in any case. In this case, the probability of collision occurrence according to FIG. 7, which is under the condition of using both the conventional contactless IC card and the contactless IC card of the invention, can be found as ¼=25%.

Under the condition of using the conventional contactless IC card and the contactless IC card of the invention, the collision occurrence can be reduced in the case where the card is not provided with the use deciding unit 104 or where said unit is not activate (see the rows of star mark in FIG. 7), better than others.

Subsequently, the number of time slots given by the reader/writer was defined as 2 in the above description, and a case where the number of time slots is 4 is discussed hereinafter.

FIG. 8, FIG. 9 and FIG. 10 show the other examples than in FIG. 5, FIG. 6 and FIG. 7, in which the number of time slots is changed from 2 to 4 but the other conditions is not changed.

In the collision occurrence shown in FIG. 8, the conventional contactless IC cards 801 and 802 are used and the number of time slots is 4. And the probability of collision occurrence is calculated as follows.

$$4/16 = 25\%  \qquad \text{EQUATION 6}$$

In the collision occurrence shown in FIG. 9, the contactless IC cards of the invention 901 and 902 are used and the number of time slots is 4. And the probability of this collision occurrence is calculated as follows.

$$10/64 \approx 15.6\%  \qquad \text{EQUATION 7}$$

As described above, the probability of collision occurrence found by the equation 7 is smaller than that by the equation 6. Therefore, the collision probability can be reduced under the conditions of using the contactless IC cards of the invention.

In the collision occurrence shown in FIG. 10, the contactless IC card of the invention 1001 and the conventional contactless IC card 1002 are used and the number of time slots is 4. And the probability of this collision occurrence is calculated as follows.

$$5/32 \approx 15.6\%  \qquad \text{EQUATION 8}$$

As described above, the probability of collision occurrence found by the equation 8 is smaller than that by the equation 6. Therefore, the collision probability can be also reduced under the conditions of using the contactless IC card of the invention and the conventional contactless IC card.

Besides, the following discusses about a case where the contactless IC card of the invention 1001 is not provided with the use deciding unit 104, for example, that is, where it judges in any case whether there is an initial response of the other contactless IC card. In this case, the probability of collision occurrence under the condition in FIG. 10 using both the contactless IC card of the invention and the conventional contactless IC card is calculated as $1/16 \approx 6.3\%$ Under the condition of using both the conventional contactless IC card and the contactless IC card of the invention, the collision occurrence can be reduced in a case where the card is not provided with the use deciding unit 104 or if said unit is not activate (see the rows of star mark in FIG. 10), better than others.

As described above, the contactless IC card judges whether there is an initial response of the other contactless IC card and then changes the time slot for response based on the result, and hereupon it is possible to reduce the collision of initial response when the contactless IC card makes the initial response. Additionally, the execution of judging whether there is an initial response of the other contactless IC card is decided at a specific probability, and this makes it possible to reduce the collision occurrence.

Besides, in case where the contactless IC card does not judges if there is an initial response of the other contactless IC card, it may be arranged that the last slot, even if it is selected by a random number, be not changed.

The change of time slot is not executed in case where the contactless IC card does not judges if there is an initial response of the other contactless IC card, consequently it is possible to prevent from reducing selectable number of time slots.

Embodiment 2

Figure 11:
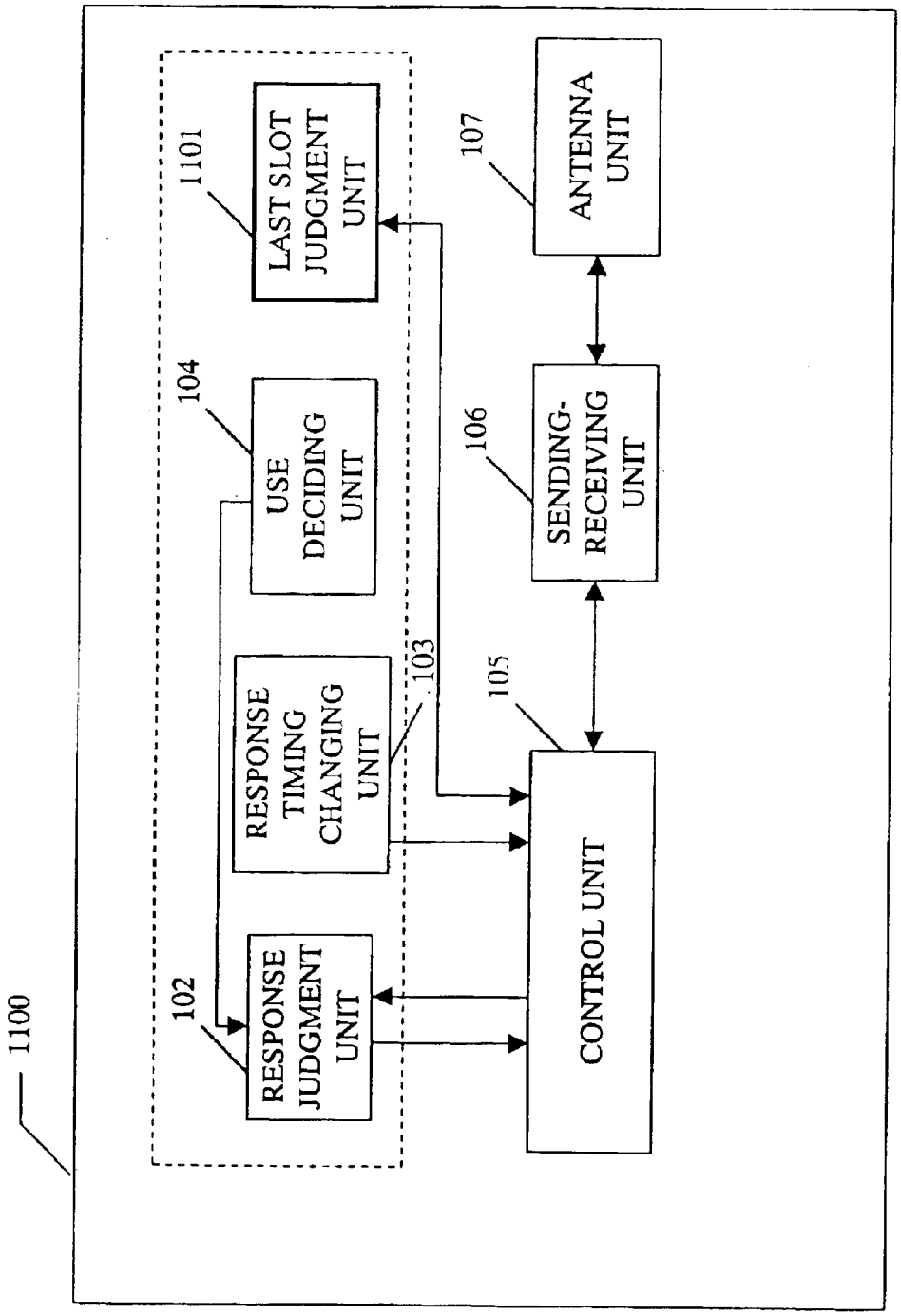
FIG. 11 is a functional block diagram of a contactless IC card in Embodiment 2.
Figure 12:
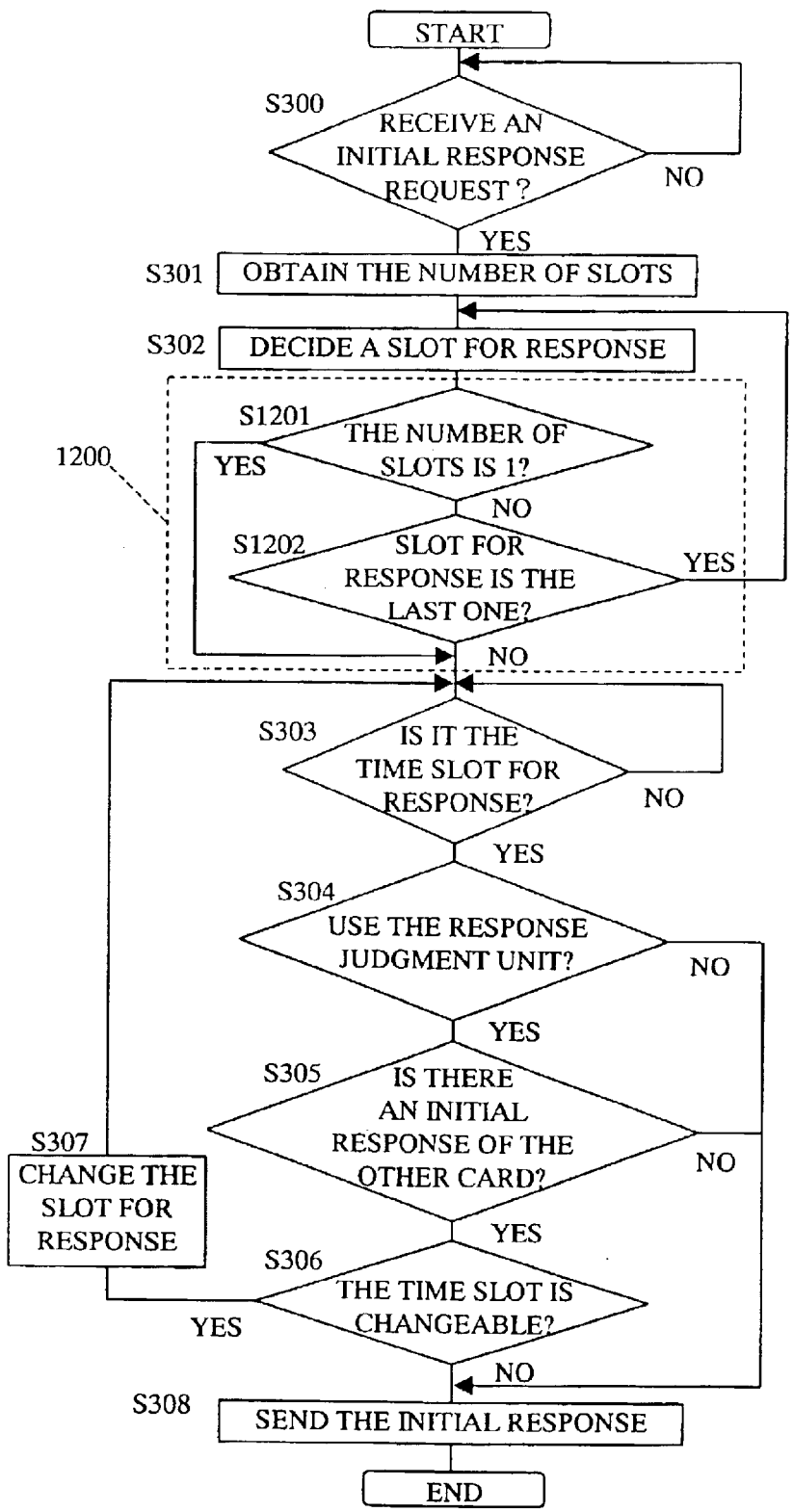
FIG. 12 is a flowchart showing the processing executed by the contactless IC card in Embodiment 2.

FIG. 11 is a functional block diagram of the contactless IC card 1100 in Embodiment 2, and FIG. 12 is a flowchart of the processing executed by the contactless IC card 1100 in Embodiment 2.

Besides, since the contactless IC card in Embodiment 2 has the same configuration as that of Embodiment 1, the following discusses about only the differences.

The contactless IC card 101 in Embodiment 1 has a following problem; in case where the contactless IC card 101 selects the last slot as the initial response slot, even when the initial response or the collision can be detected in the last slot, the collision is sure to appear because it is impossible to change the time slot. In order to settle this problem, the method described in Embodiment 2 is applied to the contactless IC card. Besides, the "last slot" mentioned in this embodiment is the "last slot that is one of a plurality of time slots given by the reader/writer and able to respond", which is corresponding to Slot 4 in FIG. 10, for example.

First, the contactless IC card 1100 waits for receiving an initial response request sent from the reader/writer, and then selects a time slot for response at receiving the initial response request; those steps are the same as those in the fore-mentioned Embodiment 1 (FIG. 11: S300 to S302).

In Embodiment 2, last slot judgment unit 1101 composing the contactless IC card 1101 judges first if the number of time slots given by the reader/writer is 1 or not (FIG. 12: S1201).

If the number of time slots given by the reader/write is not "1", the last slot judgment unit 1101 further judges if the selected time slot for response is the last one or not (FIG. 12: S1201 No to S1202).

If the selected time slot for response is the last slot, the contactless IC card 1100 re-executes the processing from the step for selecting the time slot for response (FIG. 12: S1202 YES to S302).

If the number of time slots given by the reader/write is "1" (FIG. 12: S1201 YES), or if the time slot for response is not the last slot (FIG. 12: S1201 NO), the contactless IC card 1101 wait for receiving the time slot for response and then executes the processing through the sending of the initial response in the same way of Embodiment 1 (FIG. 12: S303 to S308).

As described above, the last slot judgment unit is provided to the contactless IC card, which makes it possible to change the time slot if necessary. Therefore, this could increase the chance of avoiding the collision and it is possible to achieve the object of reducing the collision.

Besides, Step 1200 shown in FIG. 12 is a processing that the last slot judgment unit avoids selecting the last slot, however, it may be the other processing for selecting the time slot for response from the time slots indicated by a value that "1" is subtracted from the number of slots given by the reader/writer, for example.

Embodiment 3

Figure 13:
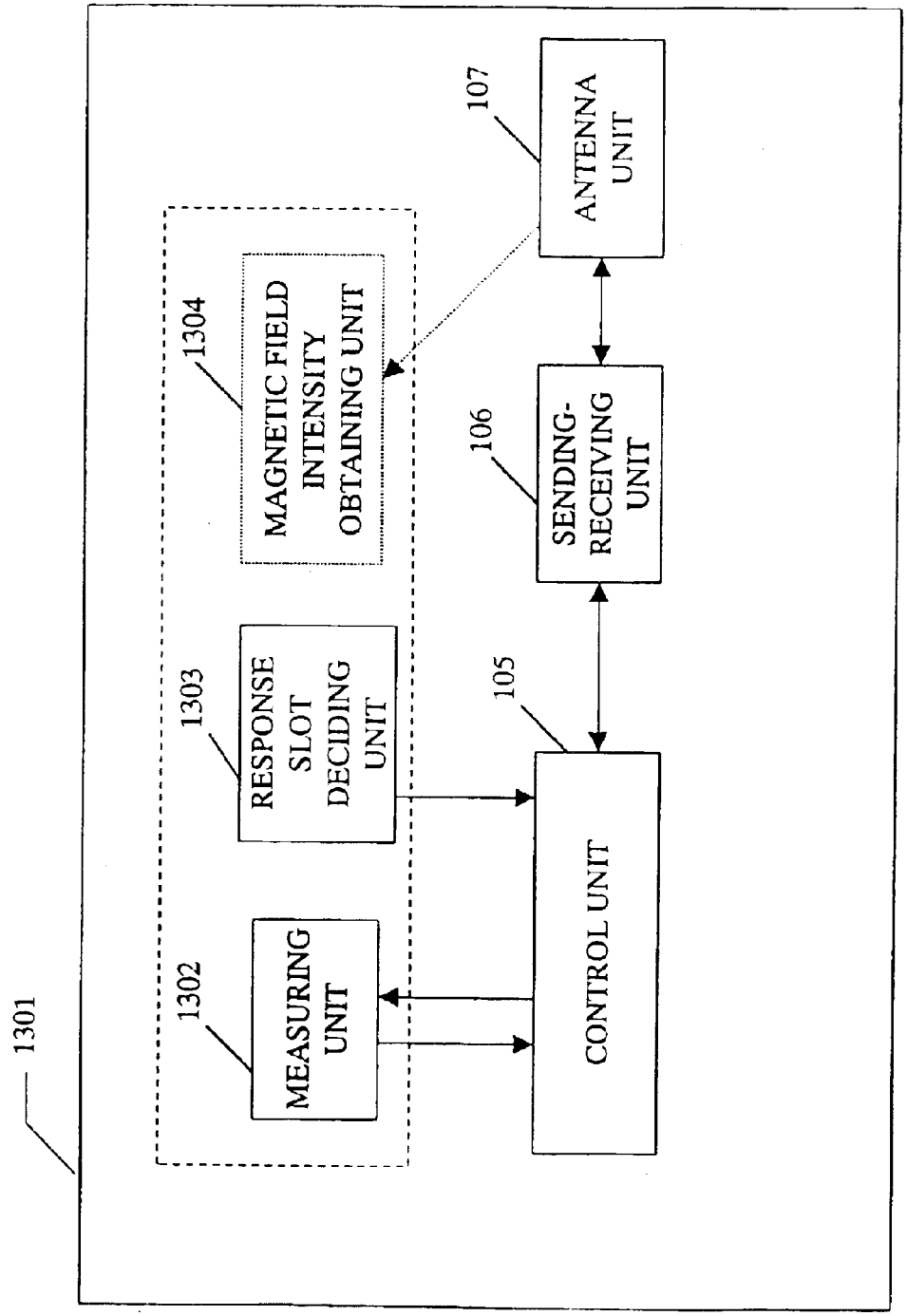
FIG. 13 is a functional block diagram of a contactless IC card in Embodiment 3.

The following explanation is related to a contactless IC card in Embodiment 3. The contactless IC card 1301 in Embodiment 3 comprises measuring unit 1302, response slot deciding unit 1303 in addition to the control unit 105, the sending receiving unit 106, and the antenna unit 107, as shown in FIG. 13. The control unit 106, the sending-receiving unit 106, and the antenna unit 107 are the same as those in Embodiments 1 and 2. The processing executed by the measuring unit 1302 and the response slot deciding unit 1303 will be explained as the occasion may demand. Besides, the relation between the electromotive force obtained in the contactless IC card and the magnetic field intensity from the reader/writer is shown in FIG. 14.

Figure 14:
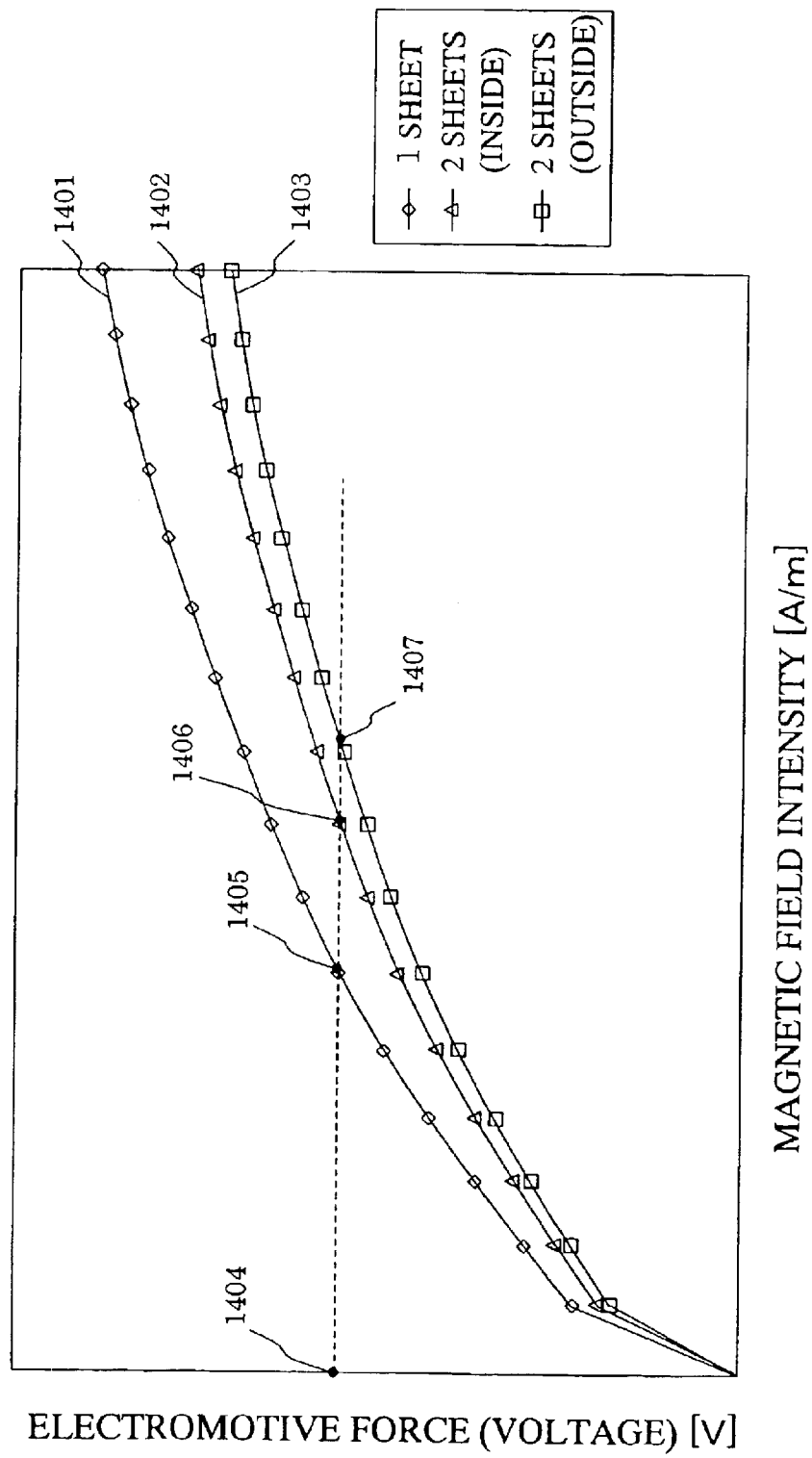
FIG. 14 is a first graph showing the relation between the electromotive force and the magnetic field intensity where the contactless IC cards are in the magnetic field.

First, an explanation is provided regarding FIG. 14. The contactless IC card can obtain the electromotive force by approaching into the magnetic field composed of electromagnetic waves generated by the reader/writer. It is well known that the electromotive force obtained in the magnetic field is varied according to the magnetic field intensity, and moreover it is obvious that the electromotive force is also varied by number of contactless IC cards. That is to say, people having a plurality of contactless IC cards usually carry them in piles in a wallet, for example. Where a person approaches into the magnetic field with carrying a plurality of contactless IC cards in the wallet like this way, the relation between the electromotive force and the magnetic field intensity as for the contactless IC cards are respectively illustrated in curves 1401, 1402 and 1403 in a graph of FIG. 14. As illustrated in the graph, the contactless IC card (inside) (curve 1402), which is closer to the reader/writer than other card, has the electromotive force (voltage) higher than the contactless IC card (outside) (curve 1403) that is more distant from the reader/writer than the other card. This might be caused by a reason that the contactless IC card (inside) absorbs the electromagnetic waves to some extent. These curves 1402 and 1403 represents a case where 2 contactless IC cards are piled, but in case of one contactless IC card, it is possible to obtain higher electromotive force than the contactless IC card (inside), as shown in curve 1401.

The invention in Embodiment 3 is arranged so as to decide a time slot in the following way by means of the above-mentioned characteristics.

First, the contactless IC card 1301 approaches into the magnetic field and hereupon the electromotive force generates, in case of which the measuring unit 1302 measures the electromotive force if necessary and sends the value of electromotive force to the response slot deciding unit 1303.

At receiving the measurement result, the response slot deciding unit 1303 calculates a differential value of the voltage at a specific time (when the voltage becomes a specific value 1404). Thereby, it is possible to obtain the voltage and the differential value of the voltage at the specific time.

Next, the response slot deciding unit 1303 compares the differential value of the voltage actually obtained at the specific electromotive voltage 1404, with the differential value of the voltage obtained from prestored information indicating relation between electromotive force and magnetic field intensity. It is possible to express the information indicating relation between electromotive force and magnetic field intensity in a graph as shown in FIG. 14. Besides, the differential value of voltage of each contactless IC card indicates the gradient of each line at points 1405, 1406 and 1407 on the curved lines 1401, 1402 and 1403, respectively.

According to the above comparison, the differential value calculated by the response slot deciding unit 1303 is identical with or approximate to any one of gradients of points 1405, 1406 and 1407, so that the condition of the contactless IC card can be estimated to some extent. That is to say, for instance, in case of the comparison result that the differential value corresponding to the specific electromotive voltage 1404 is identical with the value at the point 1406, it is possible to decide that the corresponding contactless IC card 1301 is inside of two cards.

Subsequently, after deciding the conditions of the corresponding contactless IC card 1301, the response slot deciding unit 1303 decides the time slot to be used for response from the time slots given at the initial response request.

Any method can be adopted in order to decide the time slot, however, it may be executed as follows, for example.

In case of deciding that the number of contactless IC cards is 1 (curve 1401), the response slot deciding unit 1303 selects the time slot at random usually, or selects a first time slot.

In case of deciding that the number of contactless IC cards is 2 and that the card is in inside (curve 1402), the response slot deciding unit 1303 selects a first time slot, for example. Meanwhile, in case of deciding that the number of contactless IC cards is 2 and that the card is outside (curve 1403), the response slot deciding unit 1303 selects a second time slot.

As described above, the condition of the contactless IC card is estimated based on the differential value when the electromotive force changes, the measured value of the electromotive force, and the information indicating the relation between the electromotive force and the magnetic field intensity. In result of this estimation, the response time (time slot) is decided; hereupon it is possible to reduce the collision of the initial response of the contactless IC card.

Now, the above method is for calculating the differential value by means of the response slot deciding unit 1303, however, the condition of the contactless IC card may be estimated according to the following method.

There is a system wherein the communication distance between the reader/writer and the contactless IC card is predetermined. For example, it is a system like this; after a plurality of contactless IC cards is inserted into the reader and is fixed to the reading position, the reader/writer begins to communication with the contactless IC card.

In such system, the magnetic field intensity at the communication of the contactless IC card is expected to be a fixed value. Where it is assumed that the electromagnetic field intensity at the reading position be the point 1501 in FIG. 15, for example, when the contactless IC card receives the initial response request, the voltages are due to be A1502(V), B1503(V), and C1504(V), for example, according to the conditions of the contactless IC card. Besides, A1502 represents the voltage in case of one contactless IC card, B1503 is the voltage in case of an inside contactless IC card of 2 cards, and C1504 is the voltage in case of an outside contactless IC card of 2 cards.

That is to say, based on the measured value of the electromotive force measured by the measuring unit 1302 at receiving the initial response request and the information (FIG. 15) indicating the relation between the electromotive force and the magnetic field intensity, the response slot deciding unit 1303 can estimate the conditions of the contactless IC card.

In the subsequent steps, the response slot deciding unit 1303 decides the time slot for response from the time slots given at the initial response request, which is mentioned as above.

As described above, in case of the fixed magnetic field intensity, the conditions of the contactless IC card is estimated based on the measured value of the electromotive force and the information indicating the condition between the electromotive force and the electromagnetic field intensity. In this way, the response time (time slot) is determined according the estimation result; hereupon it is possible to reduce the collision of the initial response of the contactless IC card.

Moreover, the conditions of the contactless IC card may be estimated as follows.

By the general implementation agreement, the standard of magnetic field intensity generated by the reader/writer has a specific width of band. In such case, the magnetic field intensity is varied at the reading position according to a type of reader/writer, so that the above-mentioned method could not be used. In this case, the initial response request sent by the reader/writer may contain the information of electromagnetic field intensity generated by the reader/writer.

At receiving the initial response request including the information of magnetic field intensity, magnetic field intensity obtaining unit 1304 composing the contactless IC card 1301 obtains the information of the magnetic field intensity from the initial response request, and then sends it to the response slot deciding unit 1303. For instance, where the information of the electromagnetic field intensity is a value indicated by the point 1505, A'1506(V), B'1507(V), and C'1508(V) are the values obtained from the information indicating the relation between the electromotive force and the magnetic field intensity. The each obtained value is compared with the electromotive force measured by the measuring unit 1302, thereby the response slot deciding unit 1303 can estimate the conditions of the contactless IC card.

In the subsequent steps, the response slot deciding unit 1303 decides the time slot to be used for response from the time slots given at the initial response request, which is same as aforementioned.

As described above, even if the magnetic field intensity is not fixed, the electromagnetic field intensity obtaining unit obtains the information of the magnetic field intensity included in the initial response request, so that the conditions of the contactless IC card can be estimated based on the measured value of the electromotive force, information indicating the relation between the electromotive force and the magnetic field intensity. Therefore, this makes it possible to reduce the collision of the initial response of the contactless IC card.

Figure 15:
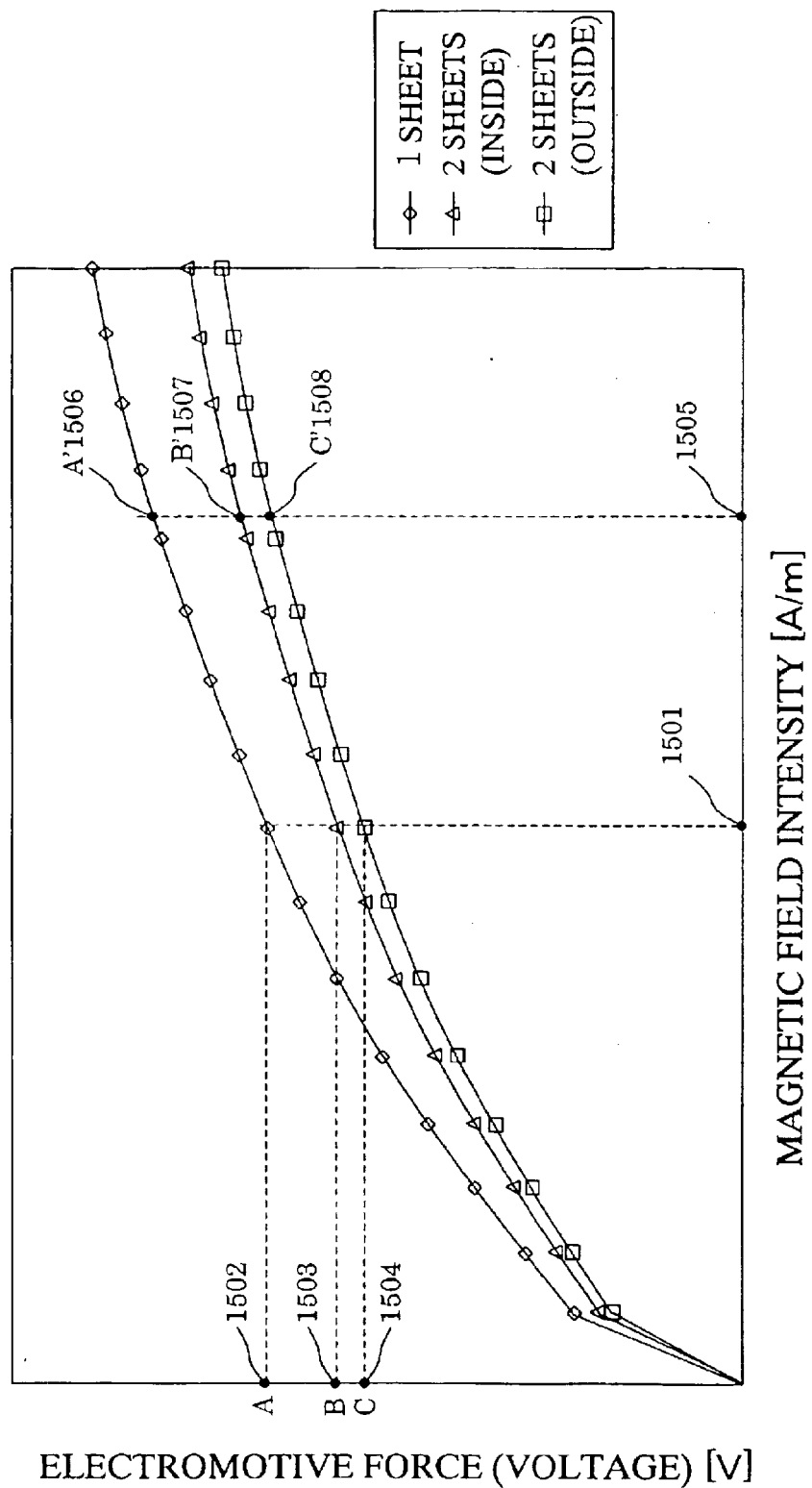
FIG. 15 is a second graph showing the relation between the electromotive force and the magnetic field intensity where the contactless IC cards are in the magnetic field.

Besides, FIG. 14 and FIG. 15 referred in this embodiment shows graphs in case of one contactless IC card and two contactless IC cards respectively, however, even if there are three contactless IC cards and more, it is possible to provide respective measured results for each card. Therefore, it is needless to say that the same processing can estimate the conditions of the contactless IC card.

As mentioned above, in the contactless IC card of the invention, the initial response of the other contactless IC card or the collision of initial response is judged, and the time slot to be used for response is changed if there is an initial response or the collision of initial response, and hereupon it is possible to control the collision of initial response at the minimum.

Additionally, the execution of judging if there is an initial response is decided by a specific probability, this makes it possible to reduce the collision occurrence at the mutual initial response of contactless IC card of this invention.

Moreover, the contactless IC card is provided with the last slot judgment unit, so that it cannot fail to change the time slot if possible. This increases chances for avoiding the collision, and it is possible to promote the reduction of the collision.

By estimating the conditions of the contactless IC card based on the differential value when the electromotive force changes, the measured value of the electromotive force, and the information indicating the relation between the electromotive force and the magnetic field intensity, and then deciding the response time (time slot) according to the estimation result, it is possible to reduce the collision of the initial response.

If the magnetic field intensity is fixed, it is possible to reduce the collision of the initial response by estimating the conditions of the contactless IC card based on the measured value of the electromotive force and the information indicating the relation between the electromotive force and the magnetic field intensity, and then deciding the response time (time slot) according to the estimation result.

Even if the magnetic field intensity is not fixed, the magnetic field intensity obtaining unit obtains the information regarding the magnetic field intensity included in the initial response request, and this makes it possible to estimate the conditions of the contactless IC card based on the measured value of the electromotive force and the information indicating the relation between the electromotive force and the magnetic field intensity. Accordingly, it is possible to reduce the collision of the initial response.

What is claimed is:

1. A contactless IC card responding to a request sent from a reader/writer using a specific time slot selected from one or a plurality of time slots given by the reader/writer, comprising:

measuring unit operable to measure electromotive force derived from the reader/writer; and response slot deciding unit operable to decide the specific time slot to respond based on the electromotive force measured by the measuring unit.

2. The contactless IC card according to claim 1, where a distance between the contactless IC card and the reader/writer is fixed, wherein the response slot deciding unit decides the specific time slot based on prestored information indicating relation between electromotive force and magnetic field intensity and the value of the electromotive force measured by the measuring unit.

3. The contactless IC card according to claim 2, further comprises magnetic field intensity obtaining unit operable to obtain, from the request, information regarding the magnetic field intensity of the electromagnetic waves outputted from the reader/writer.

4. The contactless IC card according to claim 1, wherein the response slot deciding unit decides the specific time slot based on a differential value at the transition of electromotive force and prestored information indicating relation between electromotive force and magnetic field intensity.

5. A program that allows a contactless IC card responding to a request sent from a reader/writer using a specific time slot selected from one or a plurality of time slots given by the reader/writer to execute the steps of:

measuring the electromotive force derived from the reader/writer; and deciding the specific time slot to respond based on the measurement result measured at the step of measuring the electromotive force.

6. A computer-readable recoding medium recording a program that allows a contactless IC card responding to a request sent from a reader/writer using a specific time slot selected from one or a plurality of time slots given by the reader/writer to execute the steps of:

measuring the electromotive force derived from the reader/writer; and deciding the specific time slot to respond based on the measurement result measured at the step of measuring the electromotive force.

7. The contactless IC Card according to claim 1, wherein the response slot deciding unit estimates location of the card with respect to other contactless IC cards, and decides the specific time slot based on the estimated result.

8. A responding method of contactless IC card responding to a request sent from a reader/writer using a specific time slot selected from one or a plurality of time slots given by the reader/writer, comprising the steps of:

measuring the electromotive force derived from the reader/writer; and deciding the specific time slot to respond based on the measurement result measured by the measuring unit.

* * * * *